US006985815B2

(12) United States Patent
Castagna et al.

(10) Patent No.: US 6,985,815 B2
(45) Date of Patent: Jan. 10, 2006

(54) INSTANTANEOUS SPECTRAL ANALYSIS

(75) Inventors: John P. Castagna, Norman, OK (US); Robert W. Siegfried, II, Downers Grove, IL (US); Shengjie Sun, Norman, OK (US)

(73) Assignee: Gas Technology Institute, Des Plaines, IL (US)

( * ) Notice: Subject to any disclaimer, the term of this patent is extended or adjusted under 35 U.S.C. 154(b) by 55 days.

(21) Appl. No.: 10/616,638

(22) Filed: Jul. 9, 2003

(65) Prior Publication Data

US 2005/0010366 A1 Jan. 13, 2005

(51) Int. Cl.
G06F 19/00 (2006.01)

(52) U.S. Cl. ............... 702/14; 702/11; 702/17; 73/594; 73/152.01; 367/911; 367/75; 367/74; 346/33 C; 181/108; 181/106; 175/1; 175/40; 175/50; 375/240.19

(58) Field of Classification Search .............. 702/6, 702/2, 11, 12, 17, 18; 73/594, 152; 367/911, 367/75, 74; 346/33 C; 340/856.4; 299/14; 181/108, 106; 175/50, 40, 1; 375/240.19
See application file for complete search history.

(56) References Cited

U.S. PATENT DOCUMENTS

| | | | | | |
|---|---|---|---|---|---|
| 4,750,157 | A | * | 6/1988 | Shei ............................. | 367/45 |
| 4,780,859 | A | * | 10/1988 | Hadidi et al. ................. | 367/43 |
| 4,964,086 | A | * | 10/1990 | O'Connell et al. ........... | 367/38 |
| 5,136,551 | A | * | 8/1992 | Armitage ..................... | 367/38 |
| 5,253,217 | A | * | 10/1993 | Justice et al. ................. | 367/46 |
| 5,886,255 | A | * | 3/1999 | Aronstam ................ | 73/152.01 |
| 6,108,606 | A | * | 8/2000 | Korneev et al. .............. | 702/13 |
| 6,556,922 | B2 | | 4/2003 | Anno ........................... | 702/17 |
| 6,751,558 | B2 | * | 6/2004 | Huffman et al. .............. | 702/14 |
| 6,757,343 | B1 | * | 6/2004 | Ortega et al. ................ | 375/340 |
| 6,791,899 | B2 | * | 9/2004 | Blanch et al. ................ | 367/38 |

OTHER PUBLICATIONS

Graps, 'An Introduction to Wavelets', Jan. 1995, IEEE Article, pp. 1–18.*
Stojanovic et al., 'Application of Wavelet Analysis to Seismic Signals', Oct. 1999, IEEE Article, pp. 612–615.*
Willasenor et al., 'Seismic Data Compression Using High-Dimensional Wavelet Transforms', Jan. 1996, IEEE Article, pp. 396–405.*
Hoffman et al., 'Seismic Buffer Recongnition Using Wavelet Based Features', Jan. 1998, IEEE Article, pp. 1333–1335.*
Frye, 'A Straightforward Approach to High Definition Temporal/Frequency Analysis: The Scaled Gaussian Filter (SGF)', Jan. 1999, FE, Inc. pp. 1–26.*

(Continued)

*Primary Examiner*—Marc S. Hoff
*Assistant Examiner*—Elias Desta
(74) *Attorney, Agent, or Firm*—Madan, Mossman & Sriram, P.C.

(57) ABSTRACT

A method of seismic data processing is described in which a particular wavelet is selected from a plurality of wavelets as being most characteristic of a received seismic signal. A subtracted signal can be determined by subtracting a weighted signal of the particular wavelet from the received signal. From the subtracted signal, an additional particular wavelet can be chosen. The process of subtracting a signal and determining an additional particular one of the plurality of wavelets can be repeated until a criterion is met. The method can be repeated at several depths. The resultant spectral analysis can be used to determine, for example, an absorption coefficient.

6 Claims, 6 Drawing Sheets

(3 of 6 Drawing Sheet(s) Filed in Color)

High energy below reservoir at low frequency

OTHER PUBLICATIONS

Fernandez et al., 'Texture Segmentation of a 3D Seismic Section with Wavelet Transform and Gabor Filters', Jan. 2000, IEEE Article, pp. 354–357.*

Yiou et al., 'Data–Adaptive Wavelets and Multi–Scale SSA', Oct. 26, 1998, Physica, pp. 1–43.*

John P. Castagna et al.; *Instantaneous spectral analysis: Detection of low–frequency shadows associated with hydrocarbons*, The Leading Edge, Feb. 2003, pp. 120–127, 14 Figs.

John P. Castagna et al.; *The Use of Spectral Decomposition as a Hydrocarbon Indicator*, Gas TIPS, Summer 2002, pp. 24–27, 4 Figs.

Avijit Chakraborty et al.; *Frequency–time decomposition of seismic data using wavelet–based methods*, Geophysics, vol. 60, No. 6 (Nov.–Dec. 1995); pp. 1906–1916, 7 Figs.

Stephane G. Mallat et al.: *Matching Pursuits With Time–Frequency Dictionaries*, IEEE Transactions on Signal Processing, vol. 41 No. 12, Dec. 1993, pp. 3397–3415, 7 Figs.

Li Xia et al.; The University of Oklahoma Graduate College, *Spectral Analysis of Seismic Data Using Wavelet Transform*, a Thesis Submitted to the Graduate Faculty, 1999, i–xii, pp. 1–96, 62 Figs.

* cited by examiner

High energy below reservoir at low frequency

*High energy below reservoir at low frequency*

701

*High energy below reservoir at low frequency*

*High energy below reservoir at low frequency*

INSTANTANEOUS SPECTRAL ANALYSIS

BACKGROUND OF THE INVENTION

1. Field of the Invention

The invention relates to analysis of seismic trace data in petroleum exploration. In particular, the invention is a continuous method for obtaining a frequency spectrum for each time sample of a seismic trace.

2. Description of the Related Art

In the oil and gas industry, geophysical seismic data analysis and processing techniques are commonly used to aid in the search for and evaluation of subterranean hydrocarbon deposits. Generally, a seismic energy source is used to generate a seismic signal that propagates into the earth and is at least partially reflected by subsurface seismic reflectors (i.e., interfaces between underground formations having different acoustic impedances). The reflections are recorded in a geophysical time series by seismic detectors located at or near the surface of the earth, in a body of water, or at known depths in boreholes, and the resulting seismic data may be processed to yield information relating to the location of the subsurface reflectors and the physical properties of the subsurface formations.

Seismic or acoustic energy may be from an explosive, implosive, swept-frequency (chirp) or random source. A geophysical time series recording of the acoustic reflection and refraction wavefronts that travel from the source to a receiver is used to produce a seismic field record. Variations in the travel times of reflection and refraction events in these field records indicate the position of reflection surfaces within the earth. The analysis and correlation of events in one or more field records in seismic data processing produces an acoustic image that demonstrates subsurface structure. The acoustic images may be used to aid the search for and exploitation of valuable mineral deposits.

Accurately determining the localized spectrum of a time series or seismic trace has been a dream of geophysicists. Various techniques have been utilized in time-frequency analysis in the prior art. Traditionally, the Fast Fourier Transform (FFT) and discrete Fourier transform (DFT) have been applied. Both techniques have limited vertical resolution because the seismogram must be windowed. The spectral energy is distributed in time over the length of the window, thereby limiting resolution.

A conventional way to determine a localized spectrum is to use the method of the Short Time Fourier Transform (STFT). In STFT, tapered moving windows of the time domain signal are used to compute their Fourier spectra. The general form of this transform is:

$$STFT_\tau(f) = \int_{-\infty}^{\infty} f(t) g(t-\tau) e^{-i\omega t} dt$$

where f(t) is the time-domain function, g(t) is the window function, and $e_{-i\omega t}$ is the Fourier kernel. This method has been summarized by Nawab and Qauatieri (see Nawab et al., 1988. "Short-time Fourier transform" in Advanced Topics in Signal Processing. Lim, J., and Oppenheim, Al. Eds.: Prentice Hall Signal Processing Series, 289–337.) and employed in practice by Partyka et al. (see Partyka et al. 1999. "Interpretational aspects of spectral decomposition in reservoir characterization: The Leading Edge, 18, 353–360.) and Marfurt at al. (see Marfurt et al., 2001. "Narrow-band spectral analysis and thin-bed tuning: Geophysics, 66, 1274–283.) The analysis window function plays an important role in the STFT, where resolution issues are dependent to a large degree on window size. The longer the window size is in time, the better the resolution of the local spectrum in the frequency domain, but the worse the resolution in the time domain. The shorter the window size is, the better the resolution of the local spectrum in the time domain, but the worse the resolution in the frequency domain.

To solve the window function problem and improve the resolution in frequency domain, Burg (see Burg, J. P., 1968: Maximum entropy spectral analysis. *Modern Spectrum Analysis*, 34–48. IEEE Press.) proposed a method commonly known as the Maximum Entropy Method (MEM) and sometimes termed Autoregressive (AR) spectral analysis. MEM methods can also be found in Marple (see Marple, L., 1980, A new autoregressive spectrum analysis algorithm: IEEE Transactions on Acoustics, Speech, and Signal Processing, Vol. ASSP-28, 441-454.). MEM assumes that the sampled process is an auto-regression or satisfies the Maximum Entropy Theorem. That is, the infinite series representing the process can be predicted from finite samples observed using linear prediction or the AR model. If one can determine the AR coefficients and the prediction error, then it is possible to determine the infinite series and thus its spectrum.

In one method, for an observed sequence $$x_n = -\sum_{m=1}^{M} a_{M,m} x_{n-m} + \varepsilon_n$$

where $\alpha_{M,m}$ is the AR parameter m of the $M^{th}$ order AR process. $\epsilon_n$ represents the noise components. In terms of vectors, $$\epsilon_n = X_M^{T,n} A_m$$

where $$A_M^T = [1, a_{m,1}, \ldots, a_{M,M}] \qquad X_M^T = [x_n, x_{n-1}, \ldots, x_{n-M}]$$

and T denotes the vector transpose. If each side of the above equation is pre-multiplied by complex conjugate vector $X^*_{M,n}$ and the expected value taken, then $$\Phi_M A_M = P_M$$

where $$\Phi_M = E[X^*_{M,n} X^T_{M,n}]$$

$$= \begin{bmatrix} \phi_0 & \phi_1 & \cdots & \phi_M \\ \phi_1^* & \phi_0 & \cdots & \phi_{M-1} \\ \vdots & \vdots & & \vdots \\ \phi_M^* & \phi_{M-1}^* & \cdots & \phi_0 \end{bmatrix} = (M+1)(M+1)$$

is the Toeplitz autocorrelation matrix, $\phi_t = E(x_j x^*_{j+t})$ is the autocorrelation function at lag time t. $P_M = [P^m, 0, \ldots, 0]^t$ and $p_M = E[\epsilon_n \epsilon^*_n]^T$ is the white noise power spectral density.

By definition, the white noise is uncorrelated with all $x_m$ for m<n. Thus $E[\epsilon_n x^*_n] = E[\epsilon_n \epsilon^*_n]$.

It is proven that the power spectral density $S_x(f)$ of the series is related to the input noise power spectral density by $$S_x(f) = \frac{p_m}{\left|1 + \sum_{m=1}^{M} a_{M,m}\exp(-i2\pi f m \Delta t)\right|^2} \quad (5)$$

MEM can achieve excellent frequency resolution but can be unreliable if the signal violates the assumptions of the method or if the window is too short. The major disadvantage is that it seems to be unstable, especially for less-than-expert users.

The latest approach to precluding or diminishing the problems due to windowing involves the use of the wavelet analysis. Wavelet analysis is a newly established (since the late 1980s) field in mathematics and signal processing. Like the Fourier transform, the wavelet transform also convolves through a discrete summation or continuous integration the time function (signal) with a kernel function. A method of using wavelets is found in Chakraborty et al. (see Chakraborty et al, 1995, Frequency-time decomposition of seismic data using wavelet-based methods: Geophysics, 60, 1906–1916.) as well as Xia (Xia, L., 1999, Spectra analysis of seismic data using wavelet transform: M. S. Thesis, University of Oklahoma.). In wavelet analysis, a wavelet is used as the kernel function in place of the Fourier kernel. For example, given a function f(t), its Fourier transform is:

$$F(f) = \int_{-\infty}^{\infty} f(t)e^{-i\omega t}dt \quad (2)$$

where $\Omega = 2\pi f$ and $e^{-i\omega t}$ is the Fourier kernel. Its corresponding wavelet transform is:

$$F_\omega(\sigma, \tau) = \int_{-\infty}^{\infty} f(t)\overline{\psi_{\sigma,\tau}(t)}dt$$

where $\overline{\psi}$ is the complex conjugate of wavelet $\psi$. Wavelet $\psi$ is a function that is square-integrable ($\psi \in L_r(R)$) having zero mean and localized in both time and frequency. Therefore, $\psi$ represents a family of wavelets that satisfies the conditions:

$$\psi_{\sigma,\tau}(t) = \frac{1}{\sqrt{\sigma}}\psi\left(\frac{t-\tau}{\sigma}\right)$$

where $\tau \neq 0$ and $\sigma \neq 1$. $\sigma$ is referred to as the scale or the wavelet find $\tau$ is referred to as the translation parameter. Note that the wavelet is normalized such that $\|\psi\|=1$.

Significantly, since wavelets are required to be localized both in time and frequency, they do not have the windowing problem of the Fourier transform and are thus well suited for localized spectral analysis. There are several different ways to cast the time series into wavelets and to compute spectral distribution therefrom. A typical method developed by Mallat et al. (see Mallat et al., 1993. "Matching pursuits with time-frequency dictionaries: IEEE Transactions on Signal Processing, 41, 3397-3415.) especially for localized spectral analysis or time-frequency analysis of seismic data is known as Matching Pursuit Decomposition (MPD).

In MPD, a family of wavelets is defined by the form $$\psi_{(\sigma,\xi,\tau)}(t) = \frac{1}{\sqrt{\sigma}}\psi\left(\frac{t-\tau}{\sigma}\right)e^{i\xi t}$$

where $\tau \neq 0$ and $\sigma \neq 0$. $\sigma$ a is referred to as the scale, $\tau$ as the translation parameter, and $\xi$ as the frequency modulation. Each wavelet in the family is called a time-frequency atom. If $\Omega(t)$ is Ganssian, these atoms are called Gabor atoms. As shown by Mallat et al., Gabor atoms provide excellent time-frequency resolution. These atoms have combinations of all possible time and frequency widths and as a result constitute a redundant set. Once atoms are defined, a best match between the signal and these atoms is found by projecting the atoms onto the signal and then computing the maximum. A residue is then computed by subtracting from the original signal the product of the atoms and the cross product of the selected atom and the signal. This decomposition is continued until the energy of the residue falls below some threshold. This method has the ability to obtain a good resolution in both time and frequency for data within an intermediate frequency range like seismic data.

Wavelet transformations have been used in filtering of seismic traces in prior art. In U.S. Pat. No. 6,556,922 B2, issued to Anno, a method is described of designing and applying filters for geophysical time series data that comprises obtaining a plurality of spatially related geophysical time series and transforming the time series using a wavelet transformation. The wavelet transformation coefficients may be organized into a plurality of sub-band traces. The method includes modifying one or more transform coefficients within a plurality of the sub-band traces or within all but one of the sub-bands of traces and then inverting the sub-band traces using an inverse transform to produce a filtered version of the transformed portion of the geophysical time series. The method allows for design and analysis of non-stationary filters and filter parameters in untransformed data space. Non-stationary signals may be filtered in all or in windowed portions of the geophysical time series data.

Interference between wavelets is a key problem with wavelet transform methods. It is possible to obtain a very good spectrum for a whole time series using the wavelet transform, without concerning oneself with interference effects. But for local spectral computation, interference effects cannot be overlooked. There is a need for a localized spectral analysis method in seismic data that gives an instantaneous spectrum of the seismic signal at each instant of time. The present invention fulfills this need.

SUMMARY OF THE INVENTION

The present invention is a method of seismic data processing. A source is used for propagating seismic waves into an earth formation and receiving signals from the formation. The received signal results from interactions of the seismic waves with the earth formation and indicates a property of the earth formation. A plurality of wavelets is defined that are usable in the wavelet transformation of the signal. The plurality of wavelets can be defined, for example, by performing a wavelet transform of the received signal. A particular wavelet is chosen from this plurality of wavelets for being most characteristic of the signal. This particular wavelet is added to a select list, and the depth of measurement is also recorded.

Upon determining a most characteristic wavelet, a subtracted signal is determined by subtracting from the received signal a weighted particular one of the plurality of wavelets.

The process can be reiterated, whereas one determines an additional particular one of the plurality of wavelets that are most characteristic of the subtracted signal. The process of subtracting a signal and determining an additional particular one of the plurality of wavelets can be repeated until a criterion is met.

At each depth, a set of selected wavelets is recorded, giving rise to a spectral analysis of the signal at that depth. The spectral analysis can be used to determine a property of the earth formation, for example, an absorption coefficient.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF PREFERRED EMBODIMENT

Figure 1:
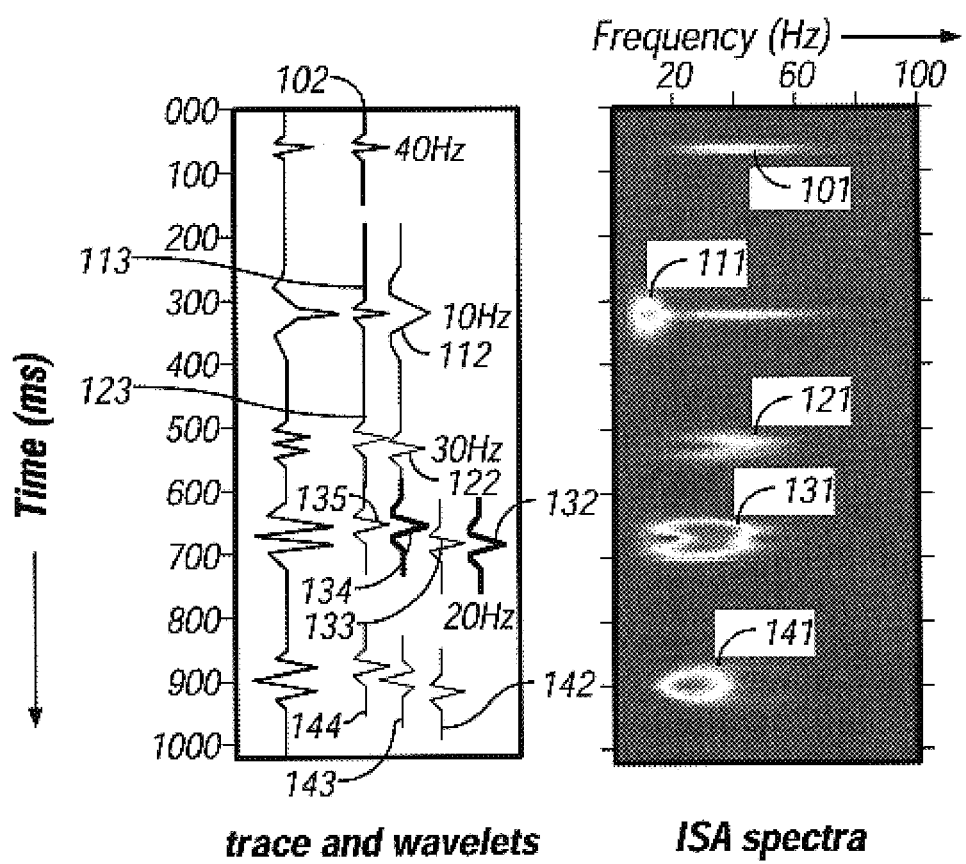
FIG. 1 shows a synthetic seismic trace and a corresponding ISA spectrum.

FIG. 1 shows a synthetic seismic trace 160 and the corresponding Instantaneous Spectrum Analysis (ISA) 170. ISA is a time-frequency analysis or localized spectral analysis method for seismic data that is evolved from the wavelet transform. This analysis gives the instantaneous spectrum of the seismic signal at each instantaneous time and eventually transforms the seismic trace from the time domain to the time-frequency domain. As a result, this kind of analysis is also referred to as time-frequency analysis. There are many different methods that can do this kind of transform, for example, short window DFT, FFT, MEM and conventional wavelet transform. ISA gives an optimized resolution both in time and frequency.

ISA is evolved from the matching pursuit decomposition (MPD) method of Mallat et al. However, ISA is different from MPD. First, ISA uses seismically realistic wavelets that are chosen to be well suited to the data, rather than arbitrary mathematical atoms. These chosen wavelets are related to the seismic source wavelet and are thus more suitable for displaying the local reflection and spectral features. Secondly, ISA strips the seismic signal or trace by matching the wavelets at the maximum amplitude instead of at the maximum correlation of the wavelet with the signal. Considering that the seismic trace is the result of convolution between source wavelet and reflection coefficients, this method will be more practical for reducing the interference between extracted wavelets and for conserving the local spectral and reflective features. ISA also has all the advantages MPD has over STFT, such as having no windowing problem and good resolution both in time and frequency for data of intermediate frequency values.

The time-frequency plot in FIG. 1 shows an amplitude spectrum for each time sample. The first arrival 101 on the synthetic seismogram results from an isolated reflector. The frequency spectrum is the spectrum of the wavelet 102. Note that the duration of the spectrum is identical to the duration of the arrival in the time domain, as opposed to Fourier-based methods in which the time duration is equal to the window length. The second event 111 is a composite of two events 112 and 113 of differing center frequency arriving precisely at the same time. The frequency spectrum indicates a low-frequency arrival 112 spread over time and a higher-frequency arrival 113 that is more localized in time. The third event 121 is caused by two interfering arrivals, 122 and 123, of the same frequency. Although the presence of two arrivals is not immediately apparent on the seismogram, the time-frequency decomposition clearly shows two distinct arrivals. The fourth event 131 is a composite of four waveforms, 132, 133, 124, and 135, arriving at two distinct times evident on the time-frequency analysis. The final event 141 consists of three arrivals 142, 143, and 144, of the same frequency that are very closely spaced in time. The three distinct arrivals cannot be resolved at low frequencies, but the separation is clearly evident on the time-frequency analysis at high frequency. It is apparent that ISA provides a useful representation of the information contained in a seismic trace.

Figure 2:
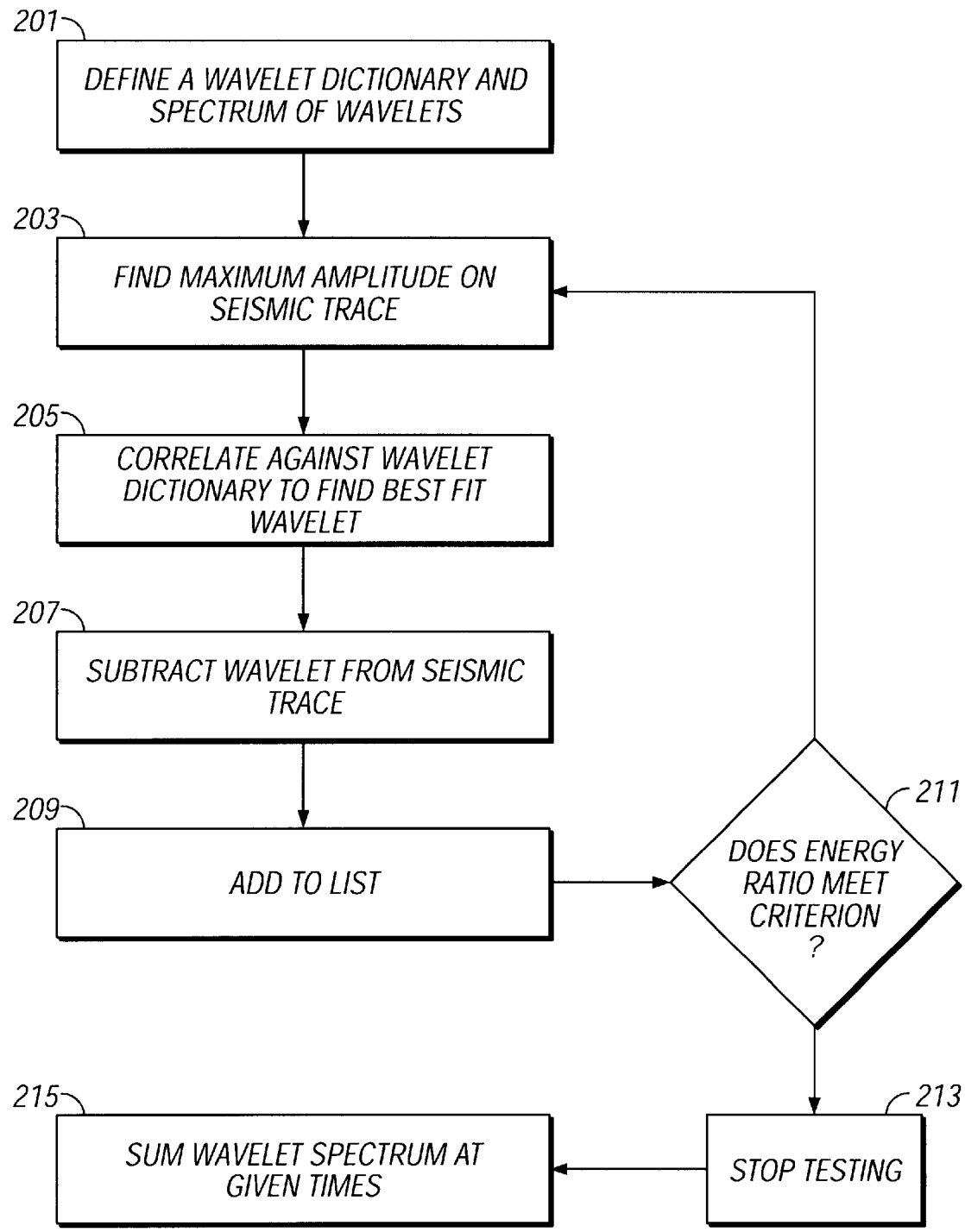
FIG. 2 shows a flowchart detailing a preferred method of the invention.

Preferably, a spectral analysis can be performed at a plurality of depths as a seismic recorder is lowered into the borehole. A preferred method for recording a spectrum with the present invention is outlined in the flowchart of FIG. 2. The method outlined gives the instantaneous spectrum of the seismic signal at each instantaneous time and eventually transforms the seismic trace from the time domain to the time-frequency domain. In Box 201, a wavelet dictionary is created preferably using a seismically realistic set of wavelets that meet convergence requirements. Although the results are most meaningful when realistic wavelets are used, the wavelet dictionary can be composed of any plurality of wavelets defined by wavelet transform theory. In Box 203, a seismic trace is taken at a specified location, and a maximum value of this seismic trace is located. In Box 205, using this maximum value, one can cross-correlate the trace against the wavelet dictionary defined in Box 201 to determine the best fit wavelet, where the best fit wavelet is most characteristic of the received signal. A signal corresponds to the most matched wavelet. With the application of a scale factor, this best fit wavelet can be subtracted from the seismic trace at the maximum location, giving rise to a subtracted signal, as is done in Box 207. Upon the subtraction performed in Box 207, the operator records at least the location, the particular wavelet dictionary element, and the scale factor to a select list of wavelets (Box 209).

In Box 211, an energy ratio of the seismic trace between original trace and residual trace is calculated. This energy ratio determines the future operation of the method. If the energy ratio is higher than a predefined criterion, the method returns to Box 203 for an iteration. Otherwise, the method continues to Box 213. Upon a second iteration of Box 203, a best-fit wavelet is determined which is most characteristic of the subtracted signal. The best fit from the second iteration is also recorded in the select list of wavelets. Again, if the newly subtracted signal from this iteration meets the criterion of Box 211, the process reiterates. Otherwise, the method stops at Box 213, where iteration ends. Operation of the method can begin again at a different location. A complete recording of wavelets at each depths leads to a spectral analysis at several depths.

In Box 215, a calculation is made of the spectral distribution of the representation of the seismic trace in the time-frequency domain. This calculation uses the recorded wavelet information of location, wavelet, and scale factor recorded earlier. For each extracted wavelet, computation is made of the spectrum and phase related to the extracted location. Subsequently, one weights the complex spectrum by the scale factor and distributes the complex spectrum of the wavelets over the time dimension by multiplying by the wavelet time envelope. Finally, all the complex spectra of each extracted wavelet are added. This yields a representation of the seismic trace in the time-frequency domain.

An absorption coefficient can be determined from prior art methods using the results of the spectral analysis. In prior art methods, a decay of the spectrum of the signal between a time $T_1$ and a time $T_2$ is determined by fitting an exponential of the form $e^{-\alpha(T1-T2)}$ to the spectral amplitudes, a being the decay parameter. A similar method can be used with the present invention using the much improved method of spectral analysis described above. Due to the improved resolution of the method of the present invention, absorption estimates can be made with higher resolution and accuracy than with prior art methods. A particular application of this method is in analysis of fluids in earth formations. A commonly used method in prior art for such analysis relies on either Amplitude versus Offset (AVO) or on a combination of compressional and shear wave data for identification of hydrocarbons. It is well known in the art (e.g., the classic paper by Biot) that the absorption is dependent upon the fluids in the rock. The method of the present invention thus gives an independent method for determination of fluids in rocks without using AVO or shear wave data. Alternatively, the method of the present invention can be used to corroborate results obtained by AVO or shear wave data.

Figure 3:
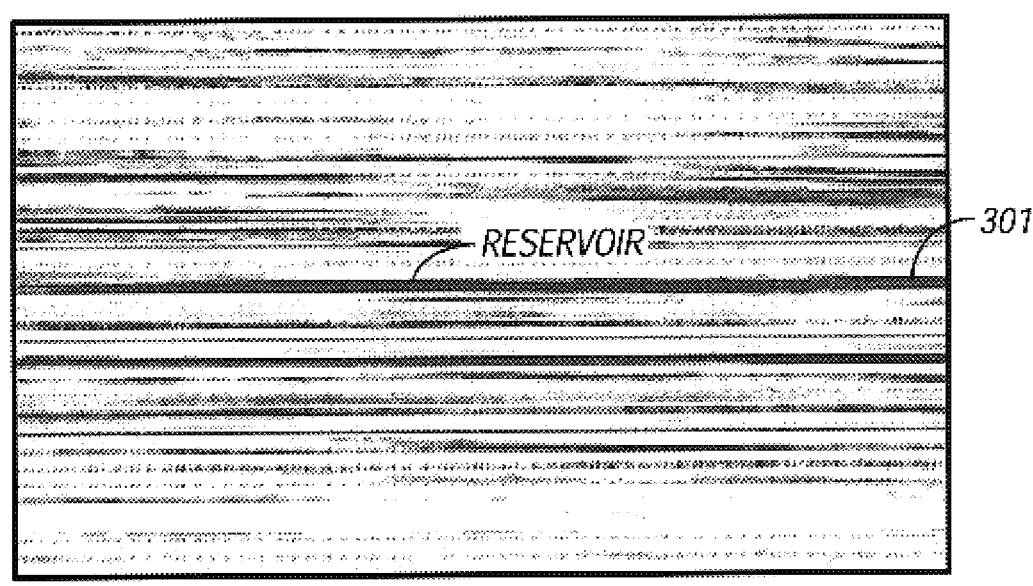
FIG. 3 shows a broad-band migrated stacked section found in the Gulf of Mexico.
Figure 4:
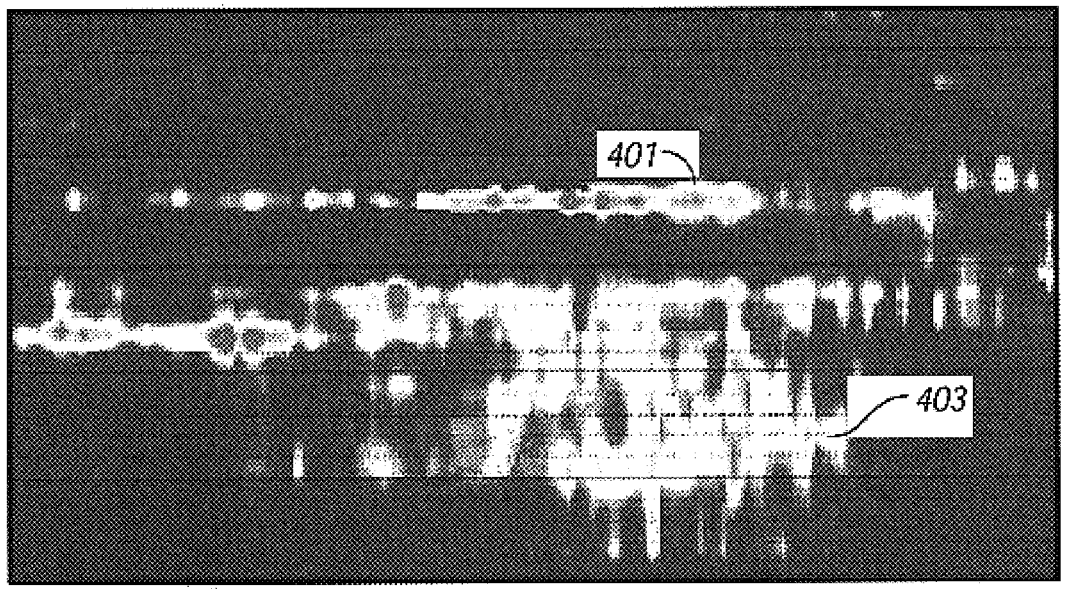
FIG. 4 shows a 10-Hz common frequency section corresponding to the broad-band section of FIG. 3.
Figure 5:
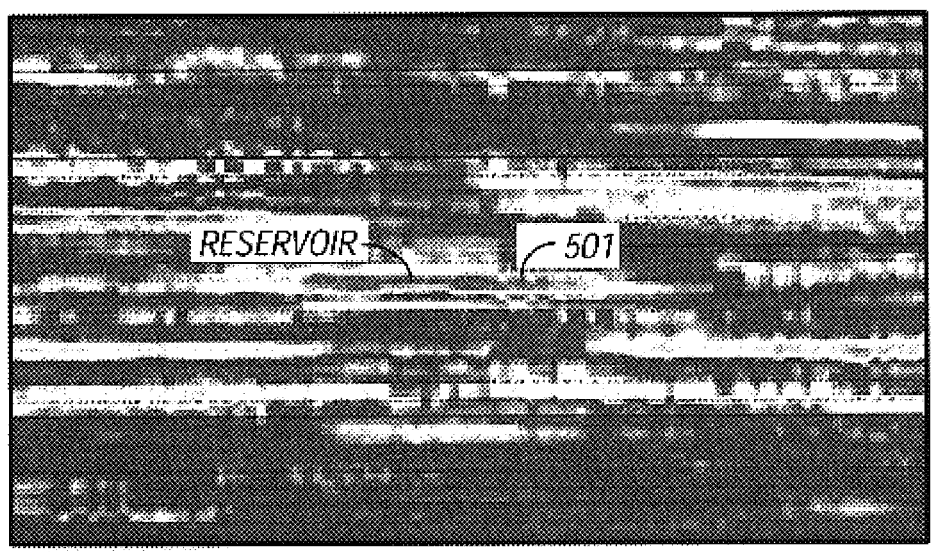
FIG. 5 shows a 30-Hz common frequency section corresponding to the broad-band section of FIG. 3.

FIG. 3 shows an example of a broad-band migrated stack section obtained in the Gulf of Mexico. FIG. 3 illustrates results of an ISA in seismic trace studies. Troughs are shown in blue, while peaks are shown in read. A reservoir can be seen at 301 and is characterized by a leading-trough (blue) on the broad-band seismic data. The reservoir is slightly brighter than nearby events. The reservoir is a classic bright spot, having low-impedance gas sands with a characteristic leading trough. No shadowing is apparent beneath the reservoir. Timing lines represent 20 ms. FIG. 4 shows an ISA section taken at 10 Hz that corresponds to the broad-band section of FIG. 3. The reservoir spot 401 in the ISA is anomalously bright at this frequency. Also important is the zone of abnormally strong low-frequency energy 403 located beneath the reservoir. Significant low-frequency energy occurs beneath the reservoir but is absent elsewhere. Timing lines are 20 msec. FIG. 5 shows another ISA section of the same section of FIG. 3, now taken at 30 Hz. The reservoir 501 is once again clearly defined, though less anomalous in amplitude, but the energy previously seen under the reservoir apparent at 10 Hz is gone at FIG. 5.

Figure 6:
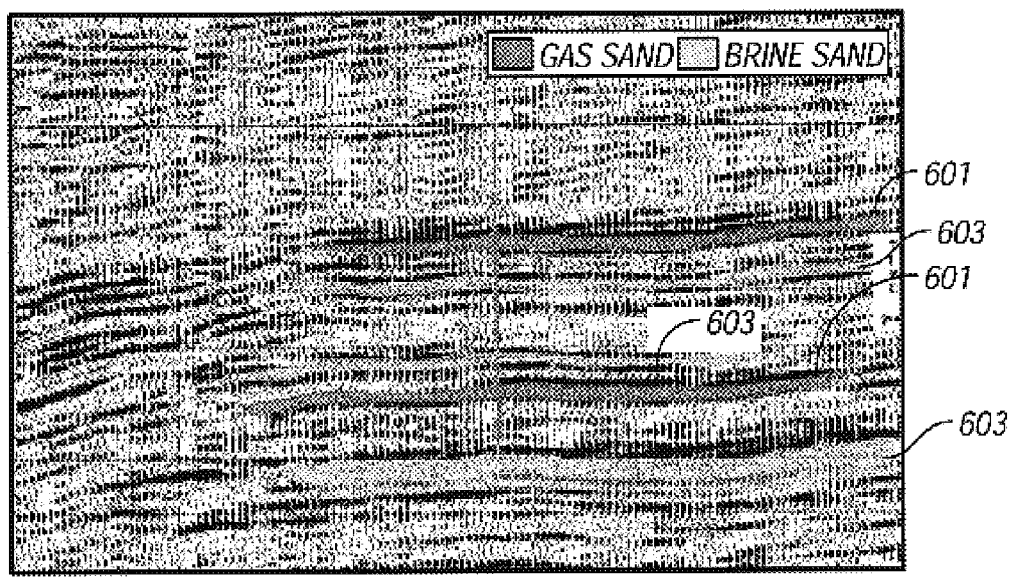
FIG. 6 shows a broad-band seismic section from the NW Shelf of Australia.
Figure 7A:
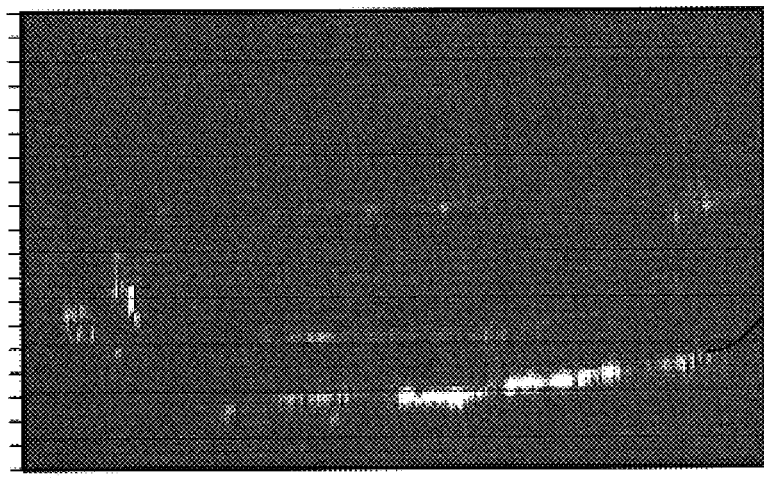
FIGS. 7A–C show 10-, 20-, and 30-Hz common frequency sections corresponding to the broad-band seismic section in FIG. 6.
Figure 7B:
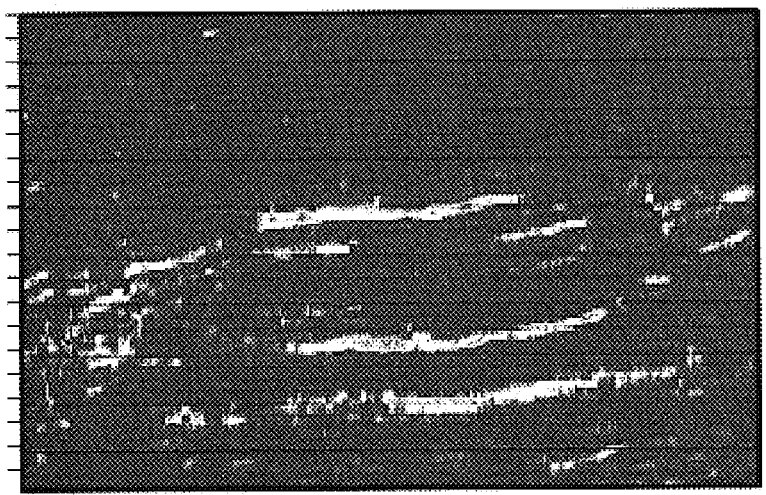
Figure 7C:
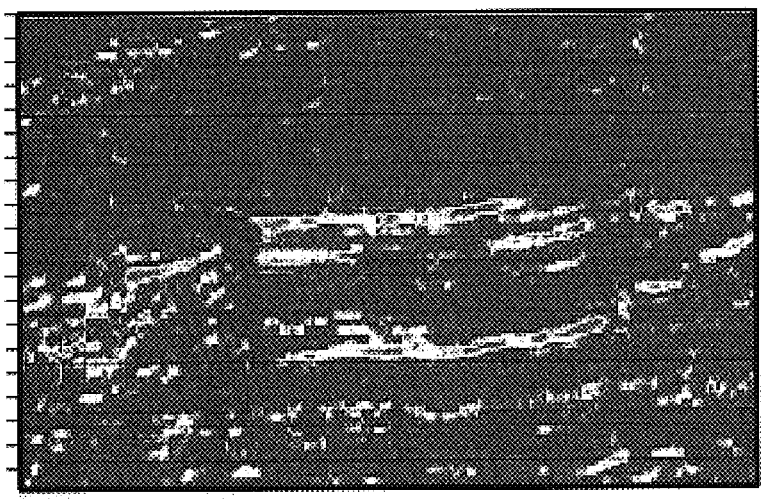

FIG. 6 shows a broad-band seismic section from the NW Shelf of Australia. The section exhibits two distinct gas reservoirs. Gas sands 601 are shown in pink and the brine sands 603 are shown in blue. FIG. 7a shows a 10 Hz common frequency section of FIG. 6. At 10 Hz, the brightest event 701 on the section is beneath the deeper gas pay. Typically, this is known to be a low-frequency shadow. In FIG. 7b, another ISA section of FIG. 6 is taken at 20 Hz. In FIG. 7b, the gas reservoirs are shown to be brighter (gas) than the shadow (brine), which still persists. In FIG. 7c, taken at 30 Hz, the shadow has completely disappeared, leaving well-defined gas sections.

Figure 8:
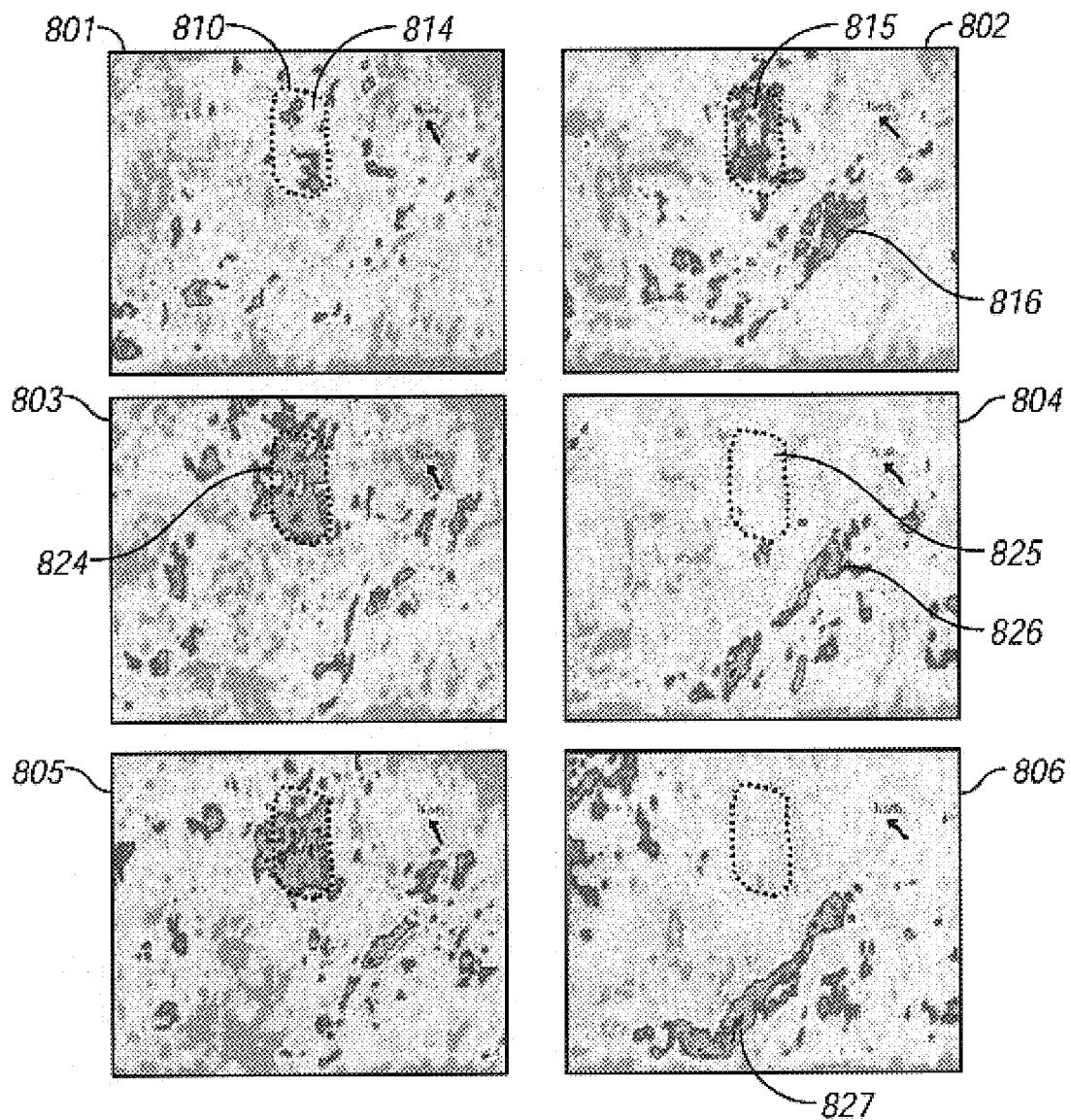
FIG. 8 shows frequency-dependent horizon slices at the top of and immediately beneath a reservoir.

It is also possible to view frequency-dependent effects in a map view. FIG. 8 shows frequency-dependent horizon slices at the top of the reservoir and for a 50-ms time window immediately beneath the reservoir. The dimensions of the reservoir are outlined by the dashed contour 810. FIG. 8a shows a 6-Hz common frequency horizon slice on the left side 801. The reservoir amplitude 814 is not particularly bright. On the right side 802, a 50-ms window immediately below the reservoir base is shown. The deeper window shows a strong shadow 815 under the reservoir but also other strong energy 816 to the lower left of the reservoir.

FIG. 8b shows a 14-Hz common frequency horizon slice on the top of a reservoir (803) and for a 50-ms window 804 immediately below the reservoir base. At 14 Hz, the reservoir 824 is a clear bright spot, the shadow 825 is gone, and the high-frequency energy to the lower left 826 persists (indicating that this energy has another origin). FIG. 8c shows a 21-Hz common frequency horizon slice on the top of a reservoir (805) and for a 50-ms window 806 immediately below the reservoir base. At 21 Hz, the energy to the lower left 827 has developed a crisp channel-like character showing that it is a stratigraphically older geologic feature unrelated to the reservoir. The indeterminate elongate features of feature 827 starts to look like a channel.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method of seismic data processing, the method comprising:

(a) using a seismic source for propagating seismic waves into an earth formation and receiving a signal indicative of a property thereof, said signals resulting from interaction of said seismic waves with the earth formation;

(b) defining a plurality of wavelets characteristic of said received signal;

(c) determining a particular one of said plurality of wavelets most characteristic of said received signal, and (d) adding said particular one of said plurality of wavelets to a select list of wavelets.

2. The method of claim 1 wherein defining said plurality of wavelets further comprises performing a wavelet transform of said receiver signal.

3. The method of claim 1 further comprising:

(i) subtracting from said received signal a weighted particular one of said plurality of wavelets, giving a subtracted signal, (ii) determining an additional particular one of said plurality of wavelets most characteristic of said subtracted signal, and (ii) adding said additional particular one of said plurality of wavelets to said select list of wavelets.

4. The method of claim 3 further comprising subtracting from said subtracted signal a weighted additional particular one of said plurality of wavelets, and iteratively repeating steps (ii) and (iii).

5. The method of claim 4, further comprising obtaining a time-frequency representation of said signal.

6. The method of claim 5 further comprising determining an absorption coefficient from said time-frequency representation.

* * * * *